United States Patent [19]
Hashimoto

[11] Patent Number: 5,115,149
[45] Date of Patent: May 19, 1992

[54] BIDIRECTIONAL I/O SIGNAL SEPARATION CIRCUIT

[75] Inventor: Yoshinori Hashimoto, Nara, Japan

[73] Assignee: Sharp Kabushiki Kaisha, Japan

[21] Appl. No.: 675,561

[22] Filed: Mar. 28, 1991

[30] Foreign Application Priority Data

Jan. 24, 1991 [JP] Japan .................................. 3-7221

[51] Int. Cl.$^5$ .................... H03K 19/092; H03K 19/00
[52] U.S. Cl. ..................................... 307/475; 307/480
[58] Field of Search ............................... 307/475, 480

[56] References Cited

U.S. PATENT DOCUMENTS

| | | | |
|---|---|---|---|
| 4,697,107 | 9/1987 | Haines | 307/475 |
| 4,789,951 | 12/1988 | Birkner et al. | 307/465 |
| 4,970,410 | 11/1990 | Matsushita et al. | 307/475 |
| 5,017,813 | 5/1991 | Galbraith et al. | 307/475 |

FOREIGN PATENT DOCUMENTS 60-96026  5/1985  Japan .

Primary Examiner—Edward P. Westin
Assistant Examiner—Richard Roseen
Attorney, Agent, or Firm—Nixon & Vanderhye

[57] ABSTRACT

A bidirectional I/O signal separation circuit for connecting a circuit device having a bidirectional I/O terminal with another circuit device having individual input and output terminals, in which an output signal of the circuit device to be connected is not supplied to an input terminal of the same circuit device, and which is able to establish a connection between a semiconductor IC device in which the logical level of a signal is used as information and a semiconductor IC device in which a pulse signal is used as information.

4 Claims, 15 Drawing Sheets

BIDIRECTIONAL I/O SIGNAL SEPARATION CIRCUIT

BACKGROUND OF THE INVENTION

1. Field of the Invention

The present invention relates to a circuit for establishing a connection between a semiconductor IC device having a bidirectional I/O (input-output) terminal for receiving, for example, an active demand signal and transmitting an active demand acknowledge signal, which is a response to that received signal, and a semiconductor IC device having input and output terminals for respectively receiving and transmitting the above-described signals.

2. Description of Related Art

There has been a known circuit for establishing a connection between a semiconductor IC device having a bidirectional I/O terminal and a semiconductor IC device having individual input and output terminals. For example, a circuit of the type described above has been disclosed in Japanese Patent Laid-Open No. 60-96026. As shown in FIG. 15, the above-described circuit comprises a buffer circuit 50 capable of bringing its output to high impedance in response to a control signal, the above-described circuit further comprising another buffer circuit 51. The output of the buffer circuit 50 and the input of the buffer circuit 51 are connected to an I/O terminal 54 of a semiconductor IC device 52. On the other hand, the input of the buffer circuit 50 is connected to an output terminal 55 of the semiconductor IC device 53, while the output of the buffer circuit 51 is connected to an input terminal 56. Thus, when a control signal is properly supplied to the circuit, a signal can be sent/transmitted between the above-described two devices 52 and 53.

Hitherto, the devices have been connected as described above, or in a case where the semiconductor IC devices 52 and 53 are the components of an information processing apparatus, the devices have not directly been connected to each other, but a process by using a software has been performed so that the similar effect to the structure in which the semiconductor IC devices are connected to each other can be obtained.

However, the circuit shown in FIG. 15 encounters a problem as follows:

(1) A signal for controlling the buffer circuit 50 must be processed in an external circuit so as to be supplied to the buffer circuit 50.

(2) The output signal from the device 53 is supplied to the I/O terminal 54 and is also undesirably directly supplied to the input terminal 56 of the device 53 via the buffer circuit 51.

(3) In the case where the logical level of the input or the output signal is used as information in the device 53 and as well as the pulse signal is used as information in the device 52, information cannot correctly be supplied/received in the circuit shown in FIG. 15 in which the terminals are simply connected to each other by a buffer circuit.

In a case where the process by using a software is performed as an alternative to the direct connection of the devices, a great quantity of system design calculations are necessary and the volume of the software for the system cannot be reduced.

SUMMARY OF THE INVENTION

An object of a first invention is to provide a bidirectional I/O signal separation circuit which is able to overcome the above-described problems, which does not need an external circuit, in which an output signal of a circuit device to be connected is not supplied to an input terminal of the same circuit device, and which is able to establish a connection between a semiconductor IC device in which the logical level of a signal is used as information and a semiconductor IC device in which a pulse signal is used as information.

An object of a second invention is to provide a bidirectional I/O signal separation circuit for automatically generating a response signal when a semiconductor IC device having individual input and output terminals transmits a signal.

FIG. 1 is a block diagram which illustrates a bidirectional I/O signal separation circuit according to a first embodiment of the present invention. Referring to FIG. 1, the bidirectional I/O signal separation circuit is capable of establishing a connection between a first circuit device 206 having an individual input terminal 208 and an output terminal 207 and a second circuit device 209 having a bidirectional I/O terminal 210. The bidirectional I/O signal separation circuit comprises an output control circuit 200 for generating an output control pulse signal when a logical level of a signal transmitted from the output terminal 207 is changed; an input control circuit 201 for generating an input control pulse signal when the logical level of the signal transmitted from the output terminal 207 is changed; an output signal generating circuit 202 for generating an output pulse signal when the logical level of the signal transmitted from the output terminal 207 is changed; a buffer circuit 203 which permits the output pulse signal to be transmitted from the output signal generating circuit 202 to the I/O terminal 210 during a time in which the output control pulse signals are supplied from the output control circuit 200 and brings its output into a high impedance state during a time in which the output control pulse signal is not supplied; a gate circuit 204 for blocking a pulse signal transmitted from the I/O terminal 210 during a time in which the input control pulse signals are supplied from the input control circuit 201; and an input signal generating circuit 205 for generating a signal the logical level of which is changed whenever the input signal generating circuit receives, via the gate circuit, a pulse signal transmitted from the I/O terminal 210 so as to supply the generated signal to the input terminal 208.

FIG. 2 is a block diagram which illustrates a bidirectional I/O signal separation circuit according to a second embodiment. Referring to FIG. 2, the bidirectional I/O signal separation circuit is capable of establishing a connection between a first circuit device 206 having an individual input terminal 208 and an output terminal 207 and a second circuit device 209 having a bidirectional I/O terminal 210. The bidirectional I/O signal separation circuit comprises an output control circuit 200 for generating an output control pulse signal when a logical level of a signal transmitted from the output terminal 207 is changed; an input control circuit 201 for generating an input control pulse signal when the logical level of the signal transmitted from the output terminal 207 is changed; an output signal generating circuit 202 for generating an output pulse signal when the logical level of the signal transmitted from the output terminal 207 is changed; a buffer circuit 203 which permits the output pulse signal to be transmitted from the output signal generating circuit 202 to the I/O terminal 210 during a time in which the output control pulse signals are supplied from the output control circuit 200 and brings its output into a high impedance state during a time in which the output control pulse signal is not supplied; a gate circuit 204 for blocking a pulse signal transmitted from the I/O terminal 210 during a time in which the input control pulse signals are supplied from the input control circuit 201; and an input signal generating circuit 211 for generating a first logical level signal when the input signal generating circuit 211 receives, via the gate circuit 204, a pulse signal transmitted from the I/O terminal 210 so as to supply the generated first logical level signal to the input terminal 208 and generating a second logical level signal when it receives an output control pulse signal from the output control circuit 200 so as to supply the generated second logical level signal to the input terminal 208.

The bidirectional I/O signal separation circuit according to the first embodiment is a circuit for establishing a connection between a first circuit device having an individual input terminal and an output terminal and a second circuit device having a bidirectional I/O terminal. The bidirectional I/O signal separation circuit according to the first embodiment comprises the output control circuit, the input control circuit and the output signal generating circuit for respectively transmitting the output control pulse signal, the input control pulse signal and the output pulse signal when the logical level of the signal transmitted from the output terminal of the first circuit device is changed. The bidirectional I/O signal separation circuit according to the first embodiment further comprises the buffer circuit for transmitting the output pulse signal transmitted from the output signal generating circuit to the I/O terminal of the second circuit device when the output control pulse signal is supplied from the output control circuit and bringing its output to high impedance when no output control pulse signal is supplied. Furthermore, the bidirectional I/O signal separation circuit according to the first embodiment comprises a gate circuit for blocking a pulse signal transmitted from the I/O terminal of the second circuit device during a time in which the input control pulse signals are supplied from the input control circuit; and an input signal generating circuit for generating a signal the logical level of which is changed whenever the input signal generating circuit receives, via the gate circuit, a pulse signal transmitted from the I/O terminal so as to supply the generated signal to the input terminal of the first circuit device.

Therefore, the bidirectional I/O signal separation circuit according to the first invention is able to establish a connection between the first and second circuit devices without an external circuit while preventing the supply of the output signal from the first circuit device to the input terminal of the bidirectional I/O signal separation circuit. Furthermore, the first circuit device in which the logical level of a signal is used as information and a second circuit device in which the pulse signal is used as information can be connected to each other.

A bidirectional I/O signal separation circuit according to the second invention is characterized in that the input signal generating circuit of the bidirectional I/O signal separation circuit according to the first invention is replaced by a circuit for generating a first logical level signal when it receives the signal from the I/O terminal of the second circuit device via the gate circuit so as to supply the first logical level signal to the input terminal of the second circuit device and generating a second logical level signal when it receives the output control pulse signal from the output control circuit so as to supply the second logical level signal to the input terminal of the second circuit device.

Consequently, an effect can be obtained in addition to the effect obtainable from the first invention in that, when the first circuit device transmits a signal, the response signal to it can automatically be generated.

Further objects and advantages of the present invention will be apparent from the following description, reference being had to the accompanying drawings wherein preferred embodiments of the present invention are clearly shown.

DESCRIPTION OF PREFERRED EMBODIMENTS

Figure 1:
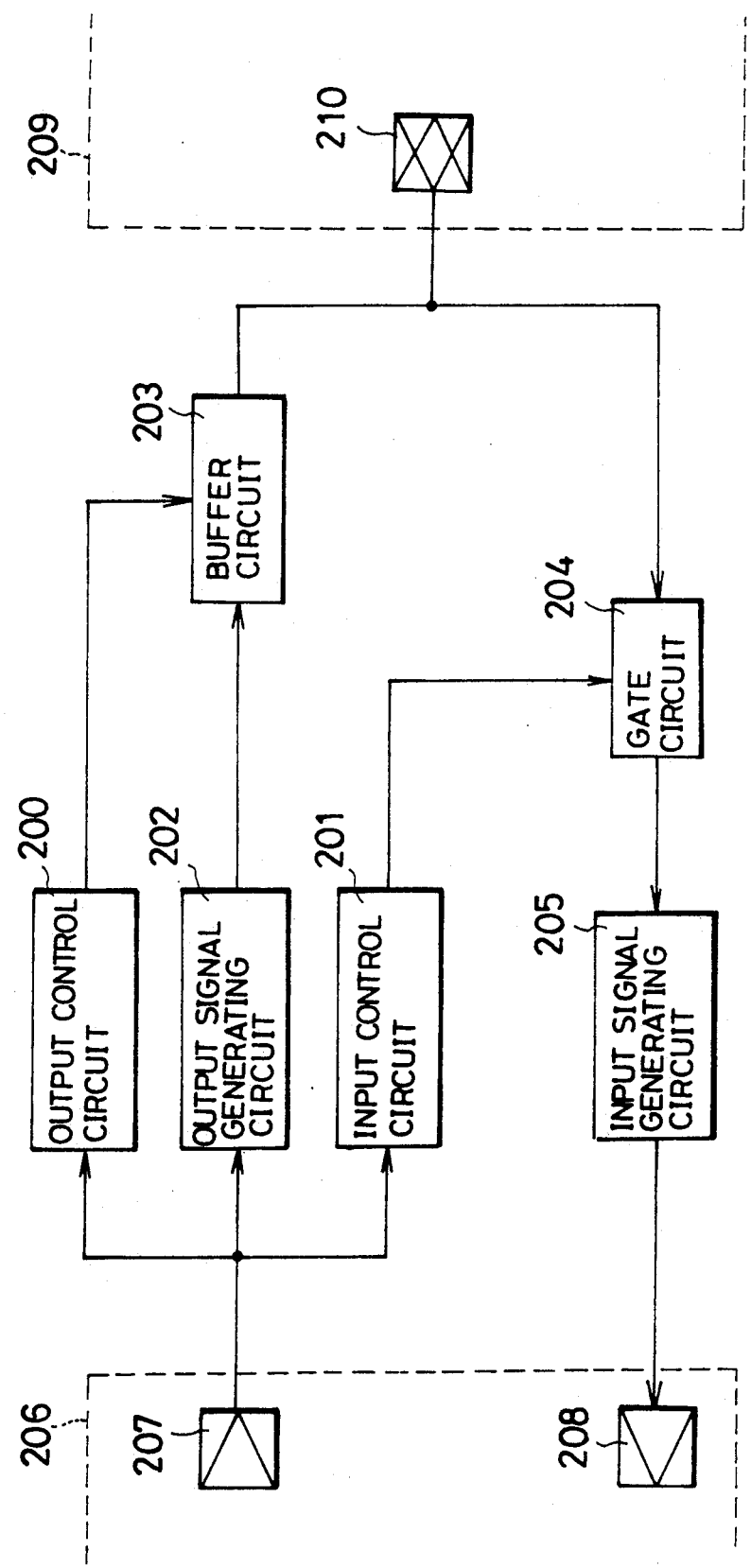
FIG. 1 is a block diagram which illustrates a bidirectional I/O signal separation circuit according to a first invention.
Figure 2:
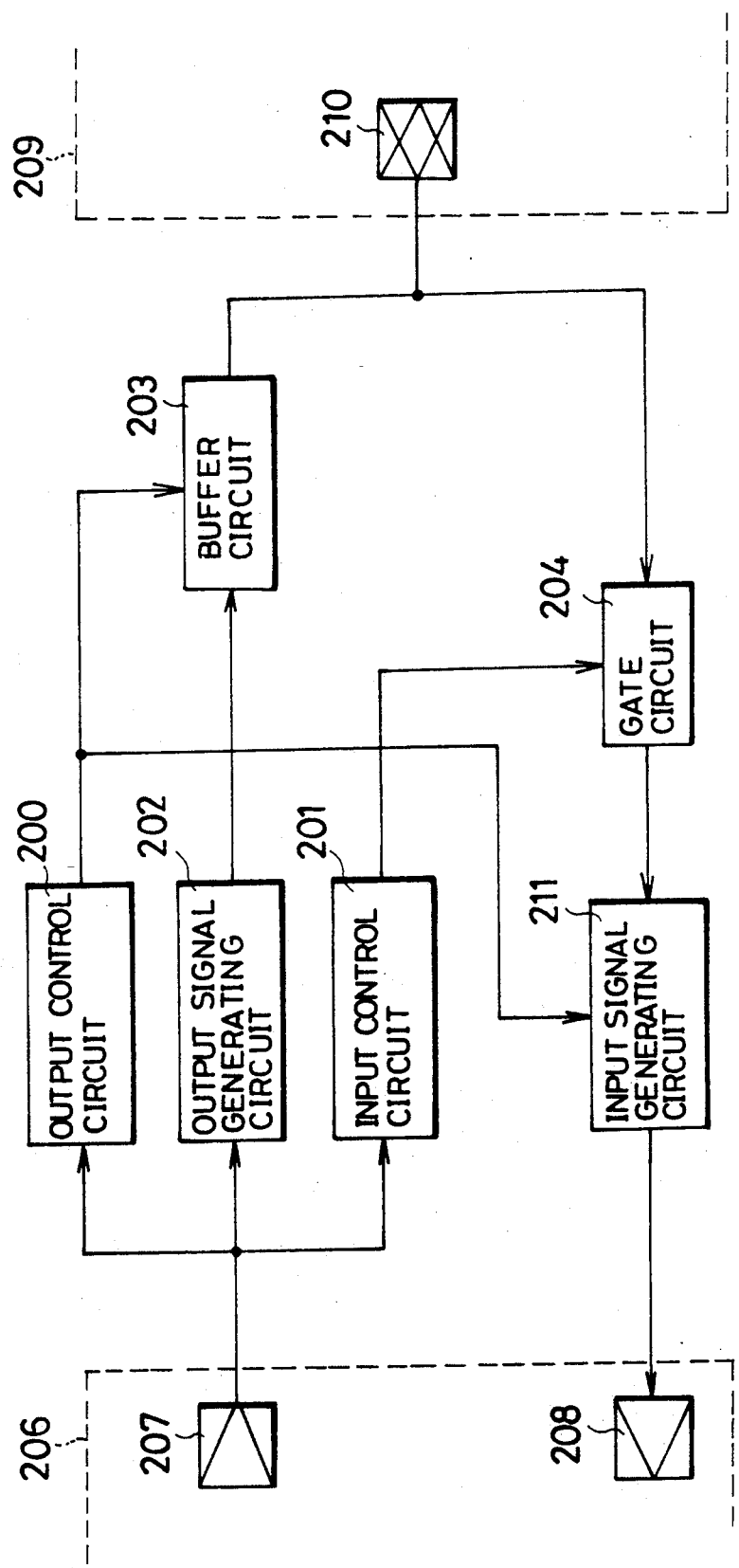
FIG. 2 is a block diagram which illustrates the bidirectional I/O signal separation circuit according to a second invention.
Figure 3:
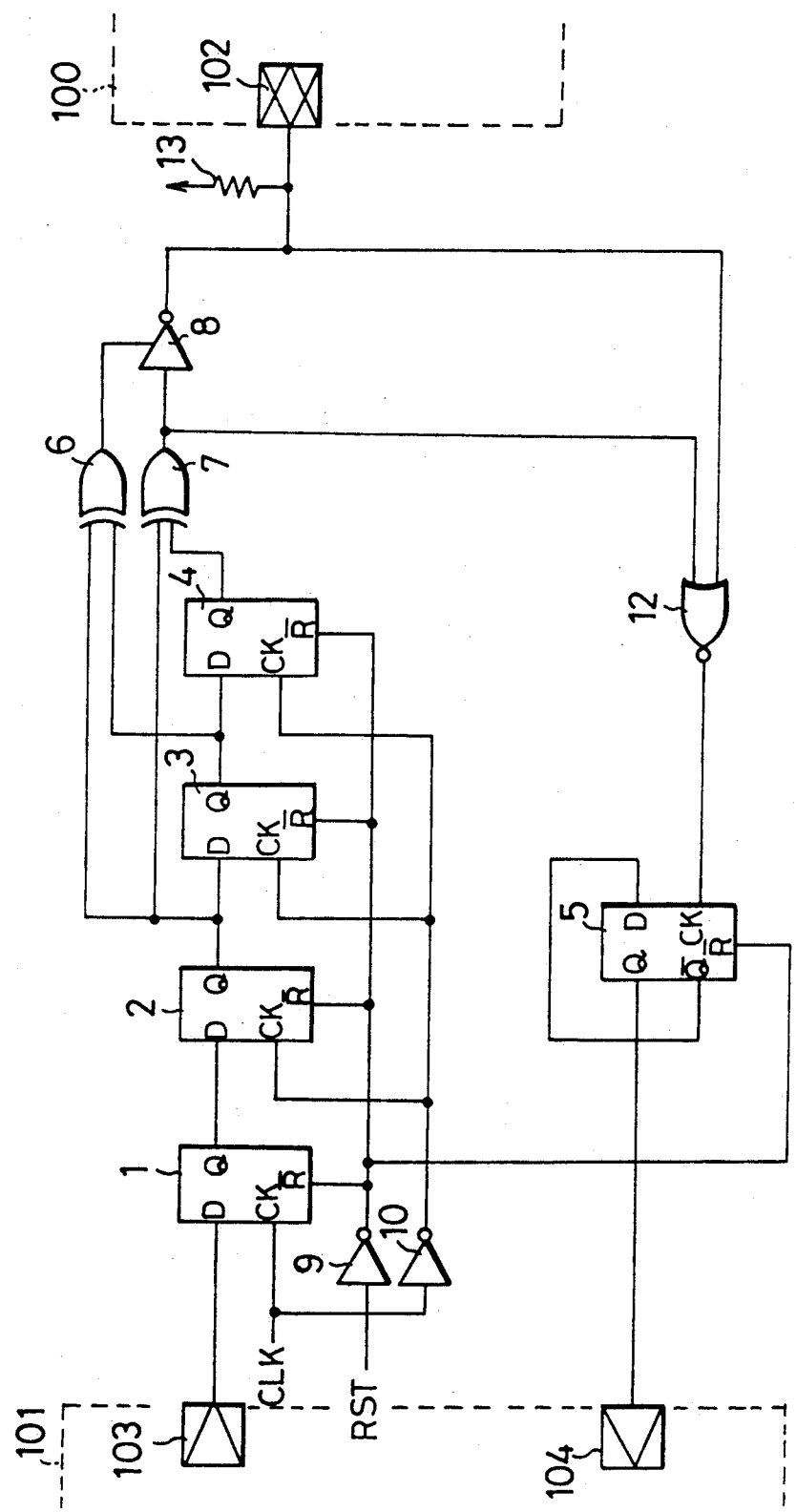
FIG. 3 is a circuit diagram which illustrates an embodiment of the bidirectional I/O signal separation circuit according to the first invention.

FIG. 3 is a circuit diagram which illustrates a first embodiment of a bidirectional I/O signal separation circuit according to the present invention. Referring to FIG. 3, the bidirectional I/O signal separation circuit comprises a D flip-flop circuits 1 to 5, EXCLUSIVE-OR circuits 6 and 7, a reverse buffer circuit 8, reverse circuits 9 and 10, a NOR circuit 12 and a pull-up resistor 13.

The flip-flop circuits 1 to 4 are connected in series in such a manner that the output Q of the flip-flop circuit 1 is connected to the input D of the flip-flop circuit 2, the output Q of the flip-flop circuit 2 is connected to the input D of the flip-flop circuit 3 and the output Q of the flip-flop circuit 3 is connected to the input D of the flip-flop circuit 4. Furthermore, the output D of the flip-flop 1 is connected to an output terminal 103 of the semiconductor IC device 101. A reset terminal of each of the flip-flop circuits 1 to 4 is connected to the output of the reverse circuit 9. The reverse circuit 9 is arranged to receive a system reset signal RST. A clock terminal (CK) of each of the flip-flop circuits 2 to 4 is connected to the output of the reverse circuit 10. A clock terminal of each of the reverse circuit 10 and the flip-flop circuit 1 is arranged to receive a system clock CLK.

The EXCLUSIVE-OR circuit 6 has two inputs which are respectively connected to the outputs Q of the flip-flop circuits 2 and 3. On the other hand, the EXCLUSIVE-OR circuit 7 has two inputs which are respectively connected to the outputs Q of the flip-flop circuits 2 and 4. The output of the EXCLUSIVE-OR circuit 6 is connected to a control terminal which controls the output of the buffer circuit 8. The output of the EXCLUSIVE-OR circuit 7 is connected to the input of the buffer circuit 8. The output of the buffer circuit 8 is connected to an I/O terminal 102 of a semiconductor IC device 100. An end of the pull-up resistor 13 is connected to the I/O terminal 102.

The NOR circuit 12 has two inputs respectively connected to the outputs from the EXCLUSIVE-OR circuit 7 and the buffer circuit 8, the NOR circuit 12 having an output connected to the clock terminal of the flip-flop circuit 5. The input D and the reverse output of the flip-flop circuit 5 are connected to each other, while output Q of the same is connected to an input terminal 104. The reset terminal of the flip-flop circuit 5 is connected to the output of the reverse circuit 9.

In the bidirectional I/O signal separation circuit thus constituted, an output control circuit is constituted by the above-described flip-flop circuits 1 to 4, the reverse circuits 9, 10 and the EXCLUSIVE-OR circuit 6, the output control circuit controlling the buffer circuit 8. On the other hand, an output signal generating circuit and an input control circuit are constituted by the flip-flop circuits 1 to 4, the reverse circuits 9, 10 and the EXCLUSIVE-OR circuit 7.

Figure 4:
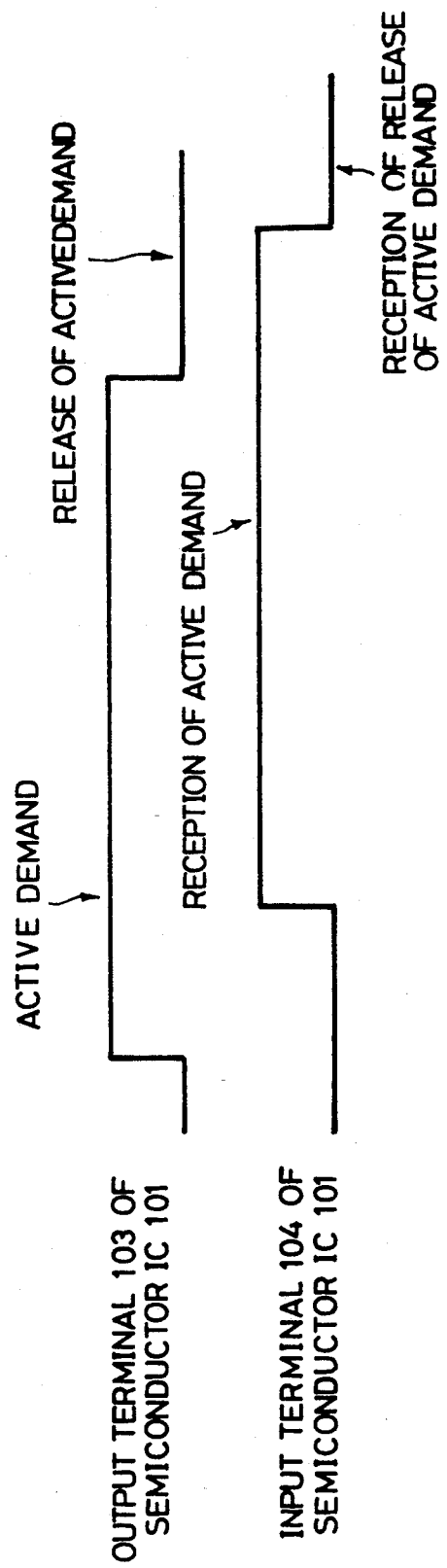
FIG. 4 is a timing chart which illustrates an output and input signals of a first semiconductor IC device to be connected to the bidirectional I/O signal separation circuit shown in FIG. 3.

Subsequently, the semiconductor IC devices 100 and 101 will now be described. The semiconductor IC device 101 is a device for sending/receiving information in accordance with the logical level of a signal. As shown in FIG. 4, the semiconductor IC device 101 transmits a high level logical signal through the output terminal 103 thereof when an active command is issued, while it transmits a low level logical signal through the output terminal 103 when the active command is cancelled. When the semiconductor IC device 101 receives, at its input terminal 104, a high level logical signal as a response signal to the above-described logical signals, the semiconductor IC device 101 makes an acknowledgement of a fact that the above-described active demand has been received. When the semiconductor IC device 101 receives, at its input terminal 104, a low level logical signal, the semiconductor IC device 101 makes an acknowledgement of a fact that the cancellation of the active demand has been received.

Figure 5:
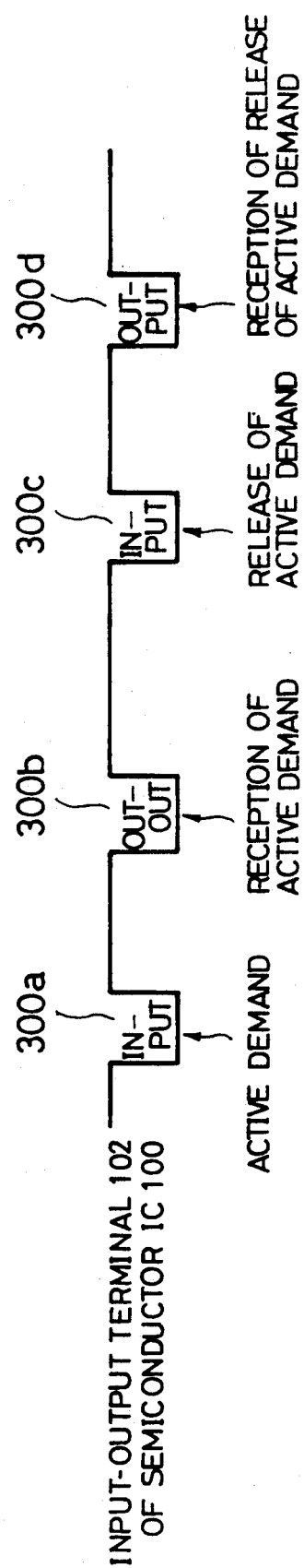
FIG. 5 is a timing chart which illustrates an output and input signals of a second semiconductor IC device to be connected to the bidirectional I/O signal separation circuit shown in FIG. 3.

The semiconductor IC device 100 is a device for sending/receiving information in accordance with a pulse signal. As shown in FIG. 5, when the semiconductor IC device 100 receives, at its I/O device 102, a low level pulse signal 300a, it makes an acknowledgement of a fact that it is the active demand so that the semiconductor IC device 100 transmits, from its I/O terminal 102, a low level pulse signal 300b as the response signal, the low level pulse signal 300b showing a fact that it has received the active demand. When the semiconductor IC device 100 receives, at its input terminal 102, a low level pulse signal 300c, the semiconductor IC device 100 receives the low level pulse signal 300c as a signal denoting the cancellation of the active demand. In consequence, the semiconductor IC device 100 transmits, from its I/O terminal 102, a low level pulse signal 300d as the response signal, the low level pulse signal 300d showing a fact that the cancellation of the active demand has been received.

Then, the operation will now be described. When the high revel reset signal RST has been supplied, the reverse circuit 9 transmits a low level signal so that the circuit is reset. That is, all of the flip-flop circuits 1 to 4 are reset and their outputs Q are thereby respectively made to be a low level. Since the level of the output from the EXCLUSIVE-OR circuit 6 is lowered, the output from the buffer circuit 8 displays high impedance, causing the level of the I/O terminal 102 to be raised due to the pull-up resistor. Since the flip-flop circuit 5 is also reset, the input terminal 104 receives a low level signal.

Figure 6:
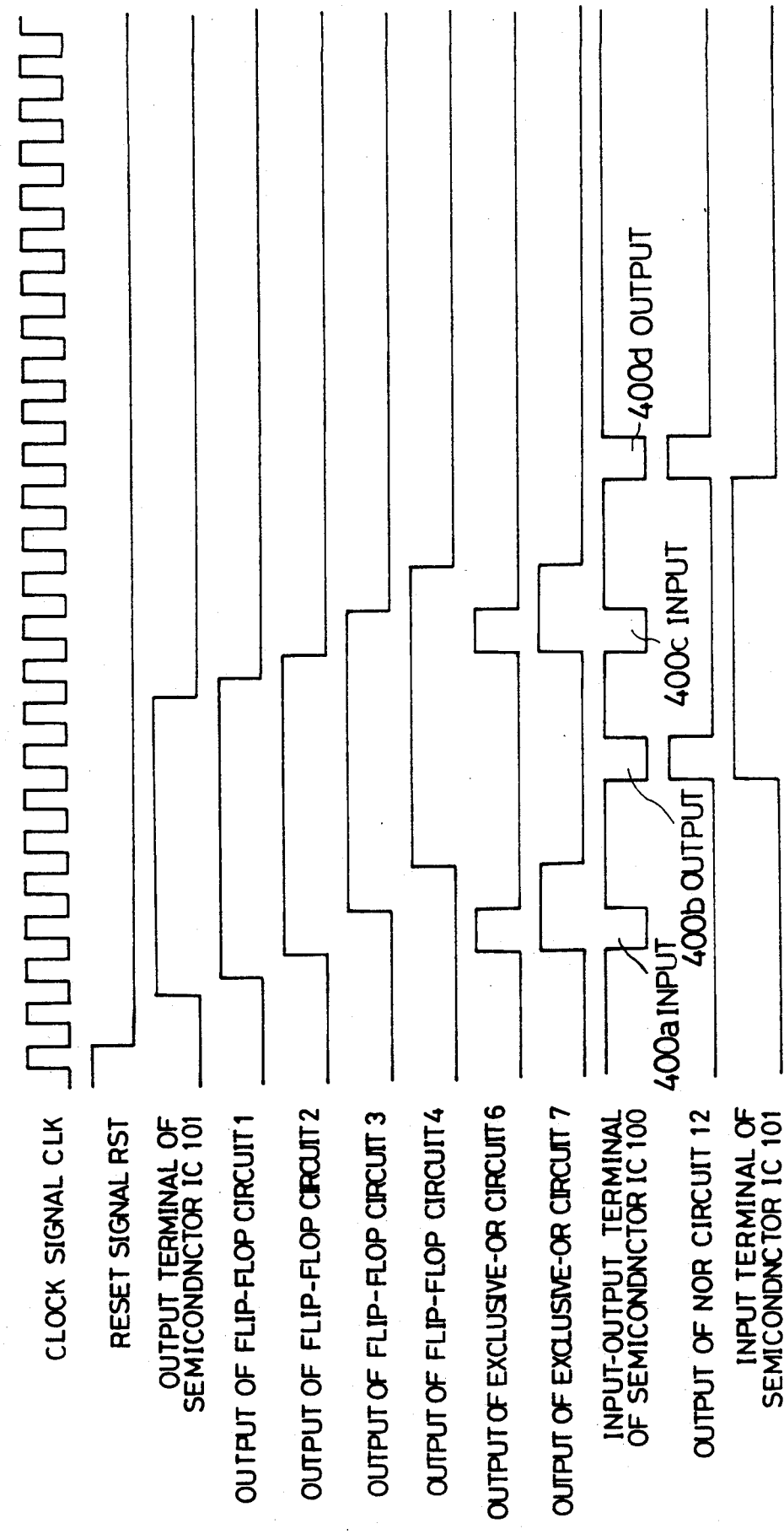
FIG. 6 is a timing chart which illustrates the operation of the bidirectional I/O signal separation circuit shown in FIG. 3.

When the device 101 transmits a high level signal as the active demand from its output terminal 103 after the resetting of the circuit is cancelled and the level of the reset signal RST is thereby lowered as shown in FIG. 6, the flip-flop circuit 1 latches the high level signal at the first transition of the clock signal CLK. In consequence, the level of the output Q from the flip-flop circuit 1 is raised. The flip-flop circuit 2 latches the output Q from the flip-flop circuit 1 at the last transition of the next clock signal CLK, the output signal from the flip-flop circuit 2 being then latched by the flip-flop circuit 3 at the last transition of the next clock signal CLK. The output signal from the flip-flop circuit 3 is latched by the flip-flop circuit 4 at the last transition of the next clock signal CLK. As a result, the level of the output from the flip-flop circuit 3 is raised while being delayed in comparison to the flip-flop circuit 2 by one clock. Furthermore, the level of the output from the flip-flop circuit 4 is raised while being further delayed by one clock.

The EXCLUSIVE-OR circuit 6 transmits high level signals as control signals until the level of the output from the flip-flop circuit 2 is raised and as well as the level of the output from the flip-flop circuit 3 is raised. Consequently, the buffer circuit 8 is enabled to transmit a signal during the above-described time. On the other hand, the EXCLUSIVE-OR circuit 7 transmits high level signals as output signals until the level of the output from the flip-flop circuit 2 is raised and as well as the level of the output from the flip-flop circuit 4 is raised. The output signal from the EXCLUSIVE-OR circuit 7 is reversed by the buffer circuit 8 so as to be, as a pulse signal 400a denoting the active demand, supplied to the I/O terminal 102 during the time in which the above-described EXCLUSIVE-OR circuit 6 transmits the high level signals. Since the output signal from the EXCLUSIVE-OR circuit 7 is also supplied to the NOR circuit 12, the level of the output from the NOR circuit 12 is forcibly maintained at the low level during the time in which that high level signal is supplied. Therefore, the output signal from the buffer circuit 8, that is, the pulse signal 400a, is not supplied to the flip-flop circuit 5. Consequently, the supply of the signal transmitted from the output terminal 103 to the input terminal 104 is prevented.

When the device 100 subsequently transmits, from its I/O terminal 102, a pulse signal 400b denoting a fact that it receives the active demand as the response to the pulse signal 400a, the level of the output from the NOR circuit 12 is changed to a high level, causing the flip-flop circuit 5 to be triggered. As a result, the level of the output Q from the flip-flop circuit 5 is raised to a high level. In consequence, a high level signal denoting a fact that the device 100 has received the active demand is supplied to the input terminal 104.

When the device 101 then transmits low level signals each of which denotes a fact that the active demand has been cancelled, the low level signals are successively received by the flip-flop circuits 1 to 4. Furthermore, the levels of the outputs from the flip-flop circuits 1 to 4 are successively changed to low levels. The EXCLUSIVE-OR circuit 6 transmits high level signals as control signals until the level of the output from the flip-flop circuit 2 is lowered and the level of the output from the flip-flop circuit 3 is also lowered. As a result, the buffer circuit 8 is enabled to transmit a signal during the above-described time. On the other hand, the EXCLUSIVE-OR circuit 7 transmits high level signals as output signals until the level of the output from the flip-flop circuit 2 is lowered and as well as the level of the output from the flip-flop circuit 4 is lowered. The output signal from the EXCLUSIVE-OR circuit 7 is reversed by the buffer circuit 8 so as to be, as a pulse signal 400c denoting the cancellation of the active demand, supplied to the I/O terminal 102 during the time in which the above-described EXCLUSIVE-OR circuit 6 transmits the high level signals. Since the output signal from the EXCLUSIVE-OR circuit 7 is also supplied to the NOR circuit 12, the level of the output from the NOR circuit 12 is forcibly maintained at the low level during the time in which that high level signal is supplied. Therefore, the output signal from the buffer circuit 8, that is, the pulse signal 400c, is not supplied to the flip-flop circuit 5. Consequently, the supply of the signal transmitted from the output terminal 103 to the input terminal 104 is prevented.

When the device 100 subsequently transmits, from its I/O terminal 102, a pulse signal 400d denoting a fact that it receives a pulse signal denoting the cancellation of the active demand as the response to the pulse signal 400c, the level of the output from the NOR circuit 12 is changed to a high level, causing the flip-flop circuit 5 to be triggered. As a result, the level of the output Q from the flip-flop circuit 5 is lowered. In consequence, a low level signal denoting a fact that the device 100 has received the cancellation of the active demand is supplied to the input terminal 104.

Figure 7:
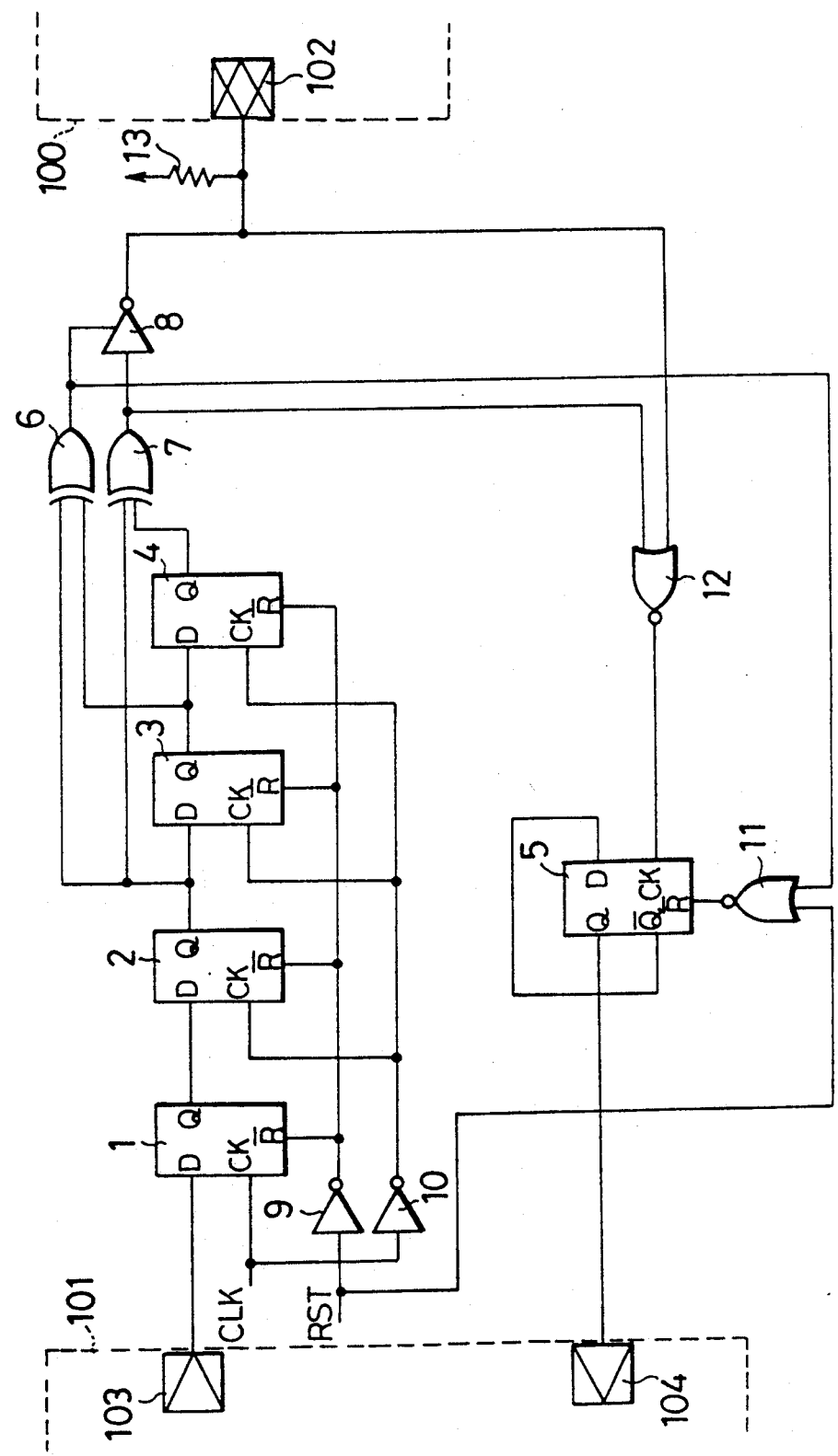
FIG. 7 is a circuit diagram which illustrates an embodiment of the bidirectional I/O signal separation circuit according to the second invention.

A second embodiment of the present invention will now be described with reference to a circuit diagram shown in FIG. 7. A bidirectional I/O signal separation circuit according to this embodiment is different from the circuit shown in FIG. 3 in that a NOR circuit 11 is connected to the reset terminal of the flip-flop circuit 5. That is, the NOR circuit 11 receives the reset signal RST at an input thereof, while the same receives an output signal from the EXCLUSIVE-OR circuit 8 at another input thereof. The output from the NOR circuit 11 is connected to the reset terminal of the flip-flop circuit 5.

Figure 8:
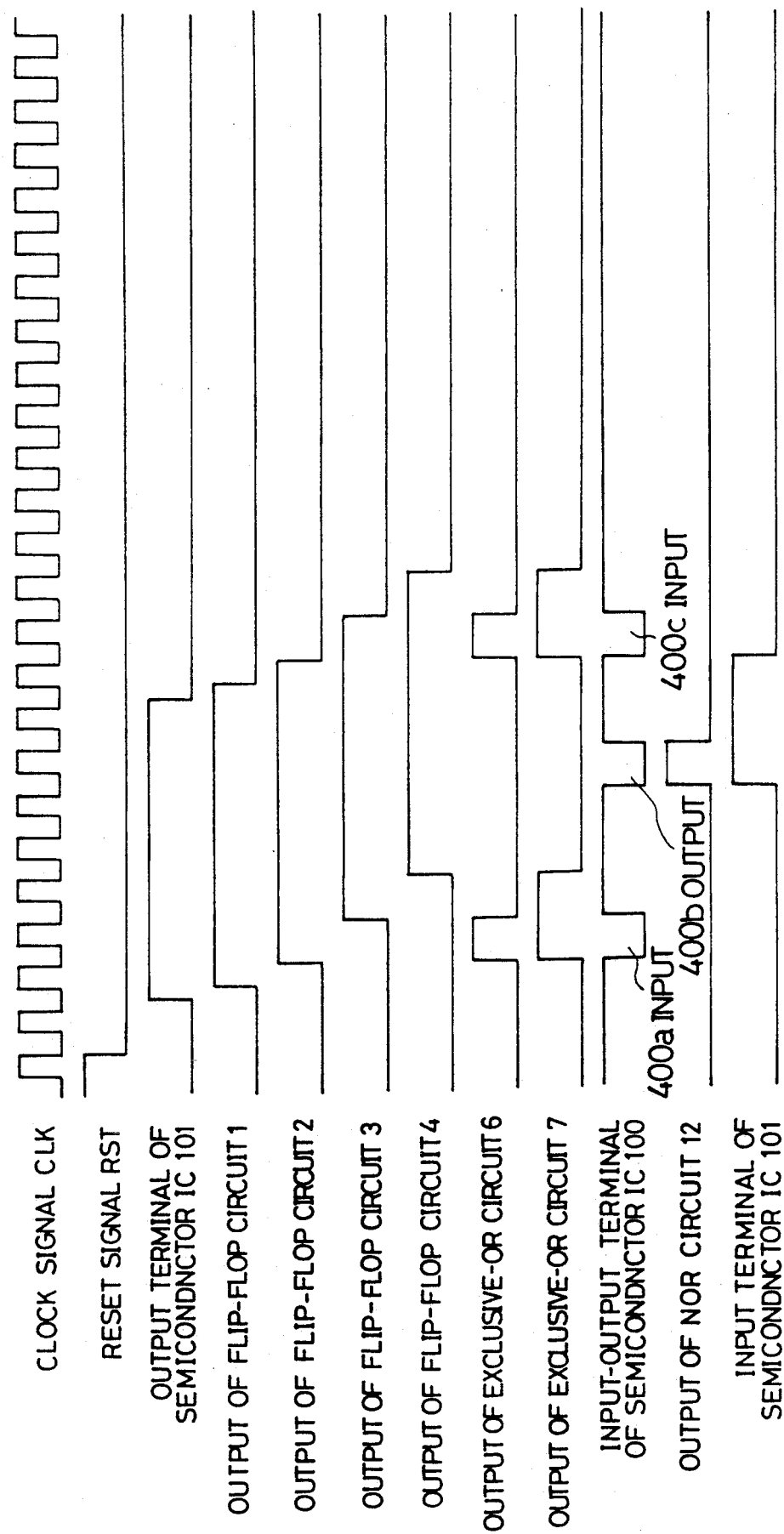
FIG. 8 is a timing chart which illustrates the operation of the bidirectional I/O signal separation circuit shown in FIG. 7.

As shown in FIG. 8, the operation of that circuit is the same as that of the circuit shown in FIG. 3 from the time at which the device 101 transmits the high level signal denoting the active demand to the time at which the device 100 transmits the low level pulse signal 400b denoting the device 100 has received the active demand.

When the device 101 then transmits low level signals each of which denotes a fact that the active demand has been cancelled, the low level signals are successively received by the flip-flop circuits 1 to 4. Furthermore, the levels of the outputs from the flip-flop circuits 1 to 4 are successively changed to low levels. The EXCLUSIVE-OR circuit 6 transmits high level signals as control signals until the level of the output from the flip-flop circuit 2 is lowered and the level of the output from the flip-flop circuit 3 is also lowered. As a result, the buffer circuit 8 is enabled to transmit a signal during the above-described time. On the other hand, the EXCLUSIVE-OR circuit 7 transmits high level signals as output signals until the level of the output from the flip-flop circuit 2 is lowered and as well as the level of the output from the flip-flop circuit 4 is lowered. The output signal from the EXCLUSIVE-OR circuit 7 is reversed by the buffer circuit 8 so as to be, as a pulse signal 400c denoting the cancellation of the active demand, supplied to the I/O terminal 102 during the time in which the above-described EXCLUSIVE-OR circuit 6 transmits the high level signals.

At this time, the high level output signal from the EXCLUSIVE-OR circuit 6 passes through the NOR circuit 11 before it is reversed so as to be supplied to the reset terminal of the flip-flop circuit 5. Therefore, the flip-flop circuit 5 is reset and the level of its output Q is thereby lowered. That is, in the bidirectional I/O signal separation circuit, when the device 100 receives the pulse signal 400c denoting the cancellation of the active demand, the low level signal denoting the receipt of the cancellation of the active demand is, as the response, automatically supplied to the input terminal 104 of the device 101.

Figure 9:
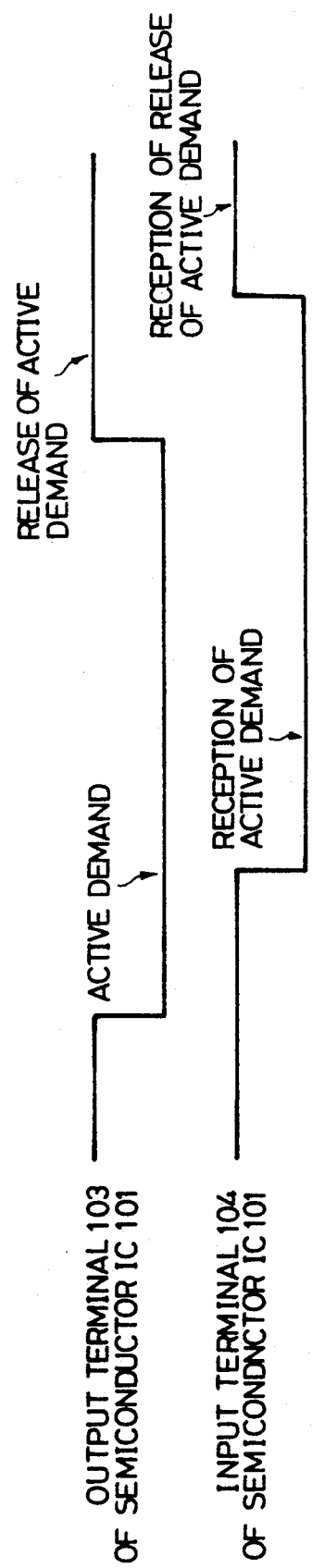
FIG. 9 is a timing chart which illustrates an output and input signals of a third semiconductor IC device to be connected to the bidirectional I/O signal separation circuit according to another embodiment of the first and second inventions.
Figure 10:
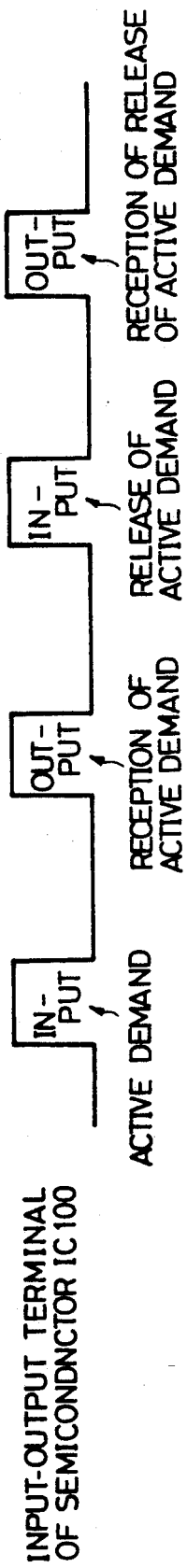
FIG. 10 is a timing chart which illustrates an output and input signals of a fourth semiconductor IC device to be connected to the bidirectional I/O signal separation circuit according to another embodiment of the first and second inventions.

According to the first and second embodiments, the description is made about the structure which is arranged in such a manner that the device 101 transmits the high level signal as the signal denoting the active demand and the same receives the high level signal as the signal denoting the receipt of the demand. Furthermore, the device 100 receives the low level pulse signal and transmits the low level pulse signal. However, the present invention can be applied to a structure arranged as shown in FIG. 9 in such a manner that the device 101 transmits a low level signal as the signal denoting the active demand and receives a low level signal as the signal denoting the receipt of the demand. Furthermore, the device 100, as shown in FIG. 10, receives a high level pulse signal and transmits a high level pulse signal. Then, other embodiments of the first and second inventions will now be described with reference to FIGS. 11 and 13.

Figure 11:
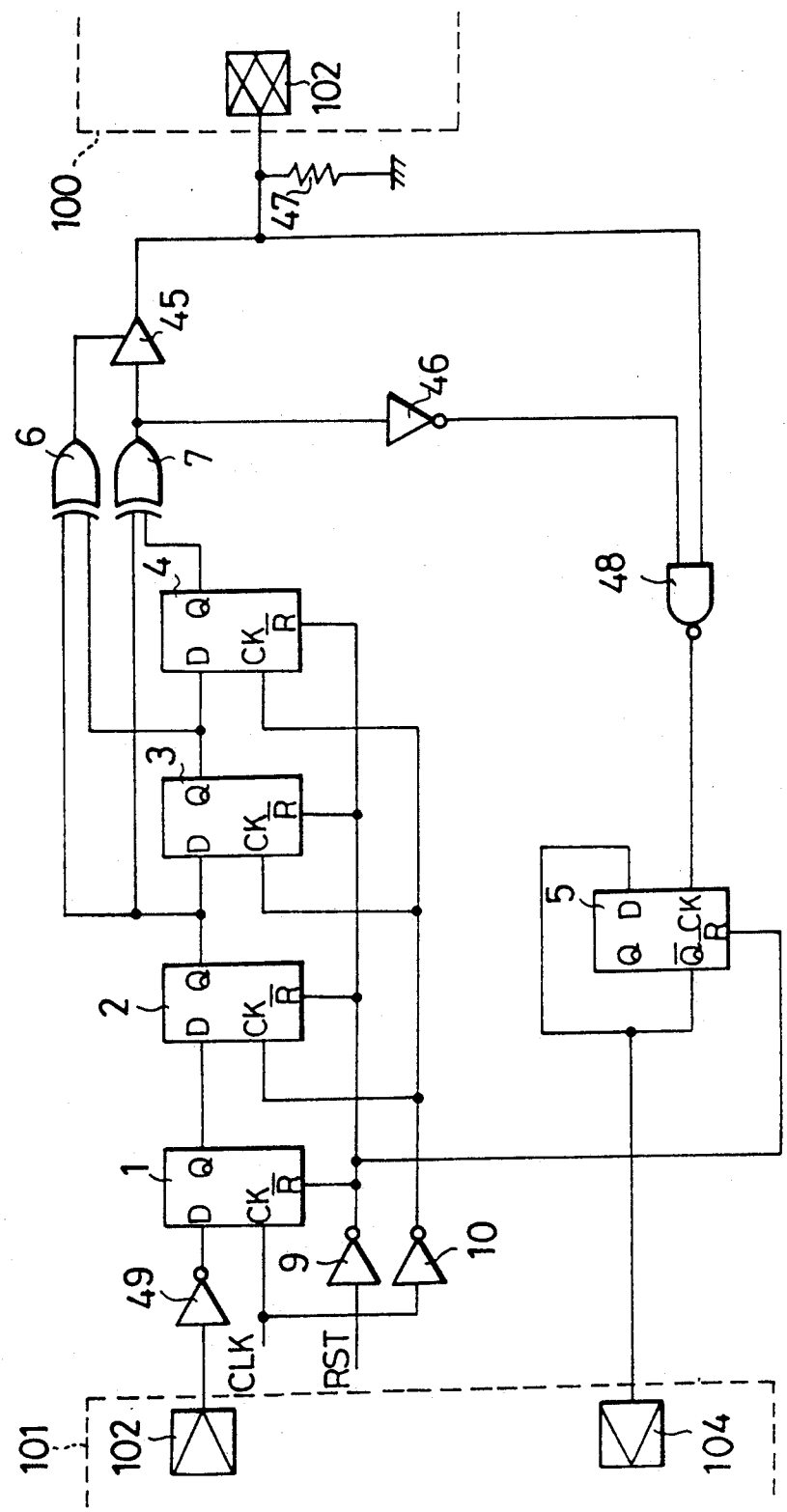
FIG. 11 is a circuit diagram which illustrates another embodiment of the bidirectional I/O signal separation circuit according to the first invention.

A circuit as shown in FIG. 11 according to another embodiment of the first embodiment is different from the circuit shown in FIG. 3 in that the NOR circuit 12, the buffer circuit 8 and the resistor 13 are respectively replaced by a NAND circuit 48, a non-reverse buffer circuit 45 and a resistor 47. Furthermore, reverse circuits 46 and 49 are added and the connection of the output from the flip-flop circuit 5 is changed. The output terminal of the NAND circuit 48 is connected to the clock terminal of the flip-flop circuit 5. Furthermore, an input of the NAND circuit 48 is connected to the I/O terminal 102, while the other input of the same is connected to the output of the reverse circuit 46. The input of the reverse circuit 46 is connected to the output from the EXCLUSION-OR circuit 7. The resistor 47 is connected between the I/O terminal 102 and the ground. The input of the buffer circuit 45 is connected to the output from the EXCLUSIVE-OR circuit 7, while the output of the same is connected to the I/O terminal 102. The control terminal of the buffer circuit 45 is connected to the output of the EXCLUSIVE-OR circuit 6. Furthermore, the reverse circuit 49 is interposed between the output terminal 103 and the input D of the flip-flop circuit 1. The reversed output from the flip-flop circuit 5 is connected to the input terminal 104.

Figure 12:
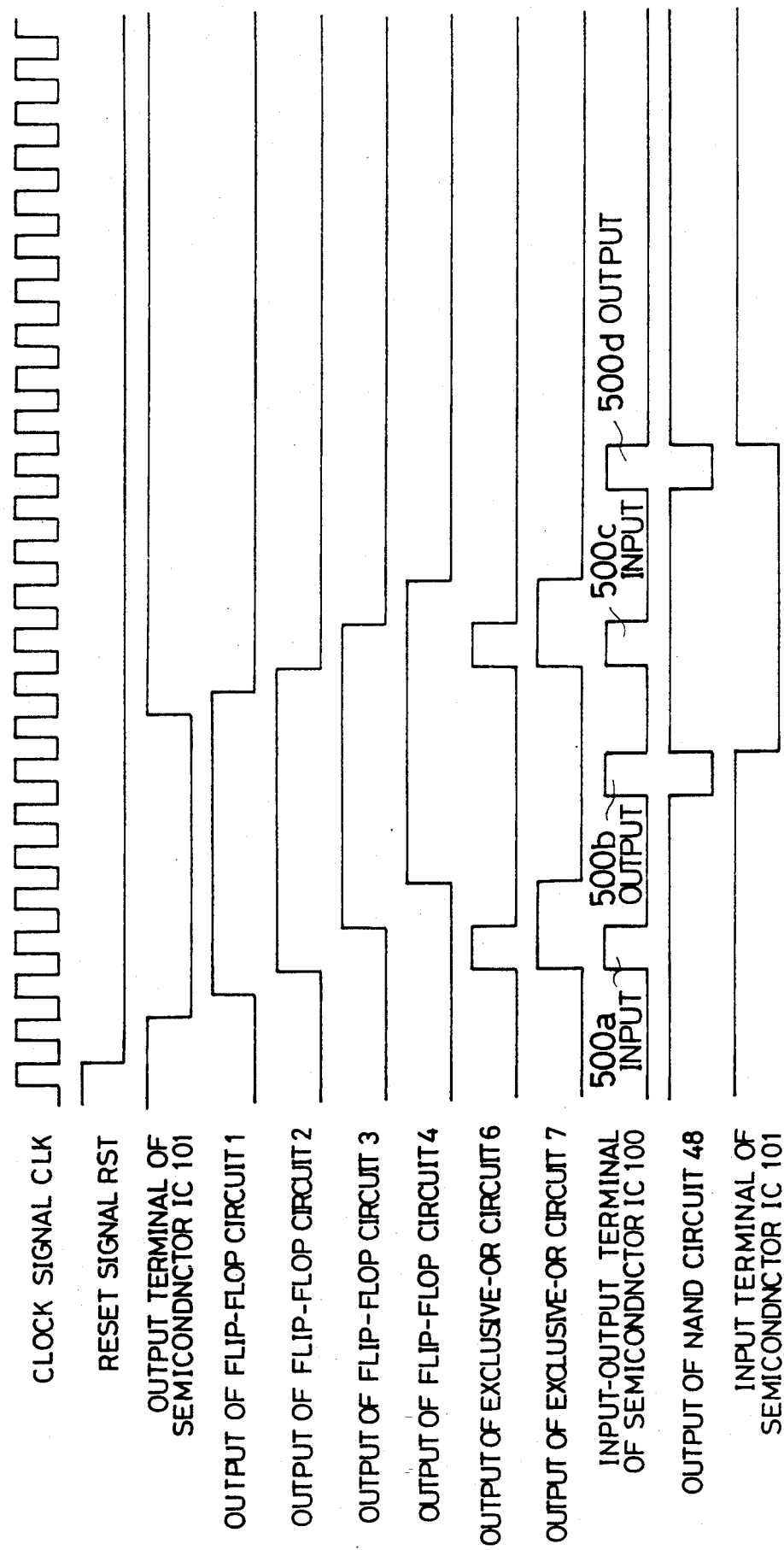
FIG. 12 is a timing chart which illustrates the operation of the bidirectional I/O signal separation circuit shown in FIG. 11.

Then, the operation of the bidirectional I/O signal separation circuit according to this embodiment will now be described. As shown in FIG. 12, when the device 101 transmits a low level signal denoting the active demand, the low level signal is reversed by the reverse circuit 49 so as to be supplied to the input D of the flip-flop circuit 1. The flip-flop circuit 1 latches the reversed signal at the first transition of the clock signal CLK. In consequence, the level of the output Q from the flip-flop circuit 1 is raised. The flip-flop circuit 2 latches the output signal from the flip-flop circuit 1 at the last transition of the next clock signal CLK, the output signal from the flip-flop circuit 2 being then latched by the flip-flop circuit 3 at the last transition of the next clock signal CLK. The output signal from the flip-flop circuit 3 is latched by the flip-flop circuit 4 at the last transition of the next clock signal CLK. As a result, the level of the output from the flip-flop circuit 3 is raised while being delayed in comparison to the flip-flop circuit 2 by one clock. Furthermore, the level of the output from the flip-flop circuit 4 is raised while being further delayed by one clock.

The EXCLUSIVE-OR circuit 6 transmits high level signals as control signals until the level of the output from the flip-flop circuit 2 is raised and as well as the level of the output from the flip-flop circuit 3 is raised. Consequently, the buffer circuit 8 is enabled to transmit a signal during the above-described time. On the other hand, the EXCLUSIVE-OR circuit 7 transmits high level signals as output signals until the level of the output from the flip-flop circuit 2 is raised and as well as the level of the output from the flip-flop circuit 4 is raised. The output signal from the EXCLUSIVE-OR circuit 7 passes through the buffer circuit 45 so as to be, as a pulse signal 500a denoting the active demand, supplied to the I/O terminal 102 during the time in which the above-described EXCLUSIVE-OR circuit 6 transmits the high level signals. Since the output signal from the EXCLUSIVE-OR circuit 7 is also supplied to the NAND circuit 48 via the reverse circuit 46, the level of the output from the NAND circuit 48 is forcibly maintained at the high level during the time in which the EXCLUSIVE-OR circuit 7 transmits the high level signals. Therefore, the output signal from the buffer circuit 45, that is, the pulse signal 500a, is not supplied to the flip-flop circuit 5. Consequently, the supply of the signal transmitted from the output terminal 103 to the input terminal 104 is prevented.

When the device 100 subsequently transmits, from its I/O terminal 102, a high level pulse signal 500b denoting a fact that it receives the active demand as the response to the pulse signal 500a, the level of the output from the NAND circuit 48 is temporarily lowered before it is raised again. As a result, the flip-flop circuit 5 is triggered. Consequently, the level of the reversed output from the flip-flop circuit 5 is lowered. In consequence, a low level signal denoting a fact that the device 100 has received the active demand is supplied to the input terminal 104.

When the device 101 then transmits high level signals each of which denotes a fact that the active demand has been cancelled, the high level signals are successively received by the flip-flop circuits 1 to 4. Furthermore, the levels of the outputs from the flip-flop circuits 1 to 4 are successively changed to low levels. The EXCLUSIVE-OR circuit 6 transmits high level signals as control signals until the level of the output from the flip-flop circuit 2 is lowered and the level of the output from the flip-flop circuit 3 is also lowered. As a result, the buffer circuit 8 is enabled to transmit a signal during the above-described time. On the other hand, the EXCLUSIVE-OR circuit 7 transmits high level signals as output signals until the level of the output from the flip-flop circuit 2 is lowered and as well as the level of the output from the flip-flop circuit 4 is lowered. The output signal from the EXCLUSIVE-OR circuit 7 is reversed by the buffer circuit 8 so as to be, as a pulse signal 500c denoting the cancellation of the active demand, supplied to the I/O terminal 102 during the time in which the above-described EXCLUSIVE-OR circuit 6 transmits the high level signals. Since the output signal from the EXCLUSIVE-OR circuit 7 is also supplied to the NAND circuit 48 via the reverse circuit 46, the level of the output from the NAND circuit 48 is forcibly maintained at the high level during the time in which that high level signal is supplied. Therefore, the output signal from the buffer circuit 8, that is, the pulse signal 500c is not supplied to the flip-flop circuit 5. Consequently, the supply of the signal transmitted from the output terminal 103 to the input terminal 104 is prevented.

When the device 100 subsequently transmits, from its I/O terminal 102, a pulse signal 500a denoting a fact that it receives a high level pulse signal denoting the active demand as the response to the pulse signal 500c, the NAND circuit 48 reverses the pulse signal 500d so as to transmit it to the clock terminal of the flip-flop circuit 5. As a result, the flip-flop circuit 5 is triggered. As a result, the level of the reversed output from the flip-flop circuit 5 is raised. In consequence, a high level signal denoting a fact that the device 100 has received the cancellation of the active demand is supplied to the input terminal 104.

Figure 13:
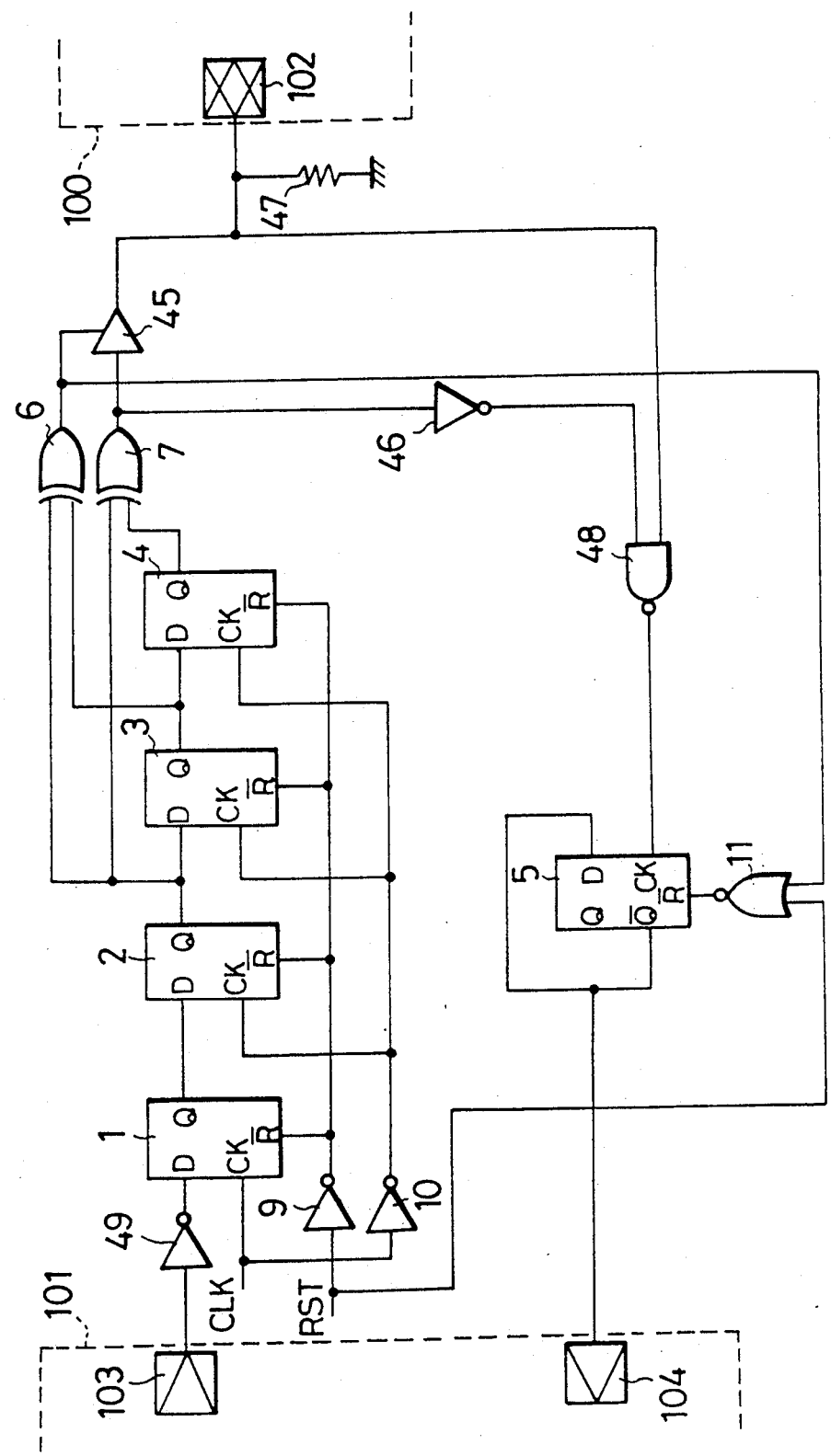
FIG. 13 is a circuit diagram which illustrates another embodiment of the bidirectional I/O signal separation circuit according to the second invention.

Then, another embodiment of the second invention will now be described. A circuit according to another embodiment of the second invention shown in FIG. 13 is different from the circuit shown in FIG. 7 in that the NOR circuit 12, the buffer circuit 8 and the resistor 13 are respectively replaced by the NAND circuit 48, the non-reverse buffer circuit 45 and the resistor 47. Furthermore, the reverse circuits 46 and 49 are added and the connection of the output from the flip-flop circuit 5 is changed. The output terminal of the NAND circuit 48 is connected to the clock terminal of the flip-flop circuit 5. Furthermore, an input of the NAND circuit 48 is connected to the I/O terminal 102, while the other input of the same is connected to the output of the reverse circuit 46. The input of the reverse circuit 46 is connected to the output of the EXCLUSION-OR circuit 7. The resistor 47 is connected between the I/O terminal 102 and the ground. The input of the buffer circuit 45 is connected to the output from the EXCLUSIVE-OR circuit 7, while the output of the same is connected to the I/O terminal 102. The control terminal of the buffer circuit 45 is connected to the output of the EXCLUSIVE-OR circuit 6. Furthermore, the reverse circuit 49 is interposed between the output terminal 103 and the input D of the flip-flop circuit 1. The reversed output from the flip-flop circuit 5 is connected to the input terminal 104.

Figure 14:
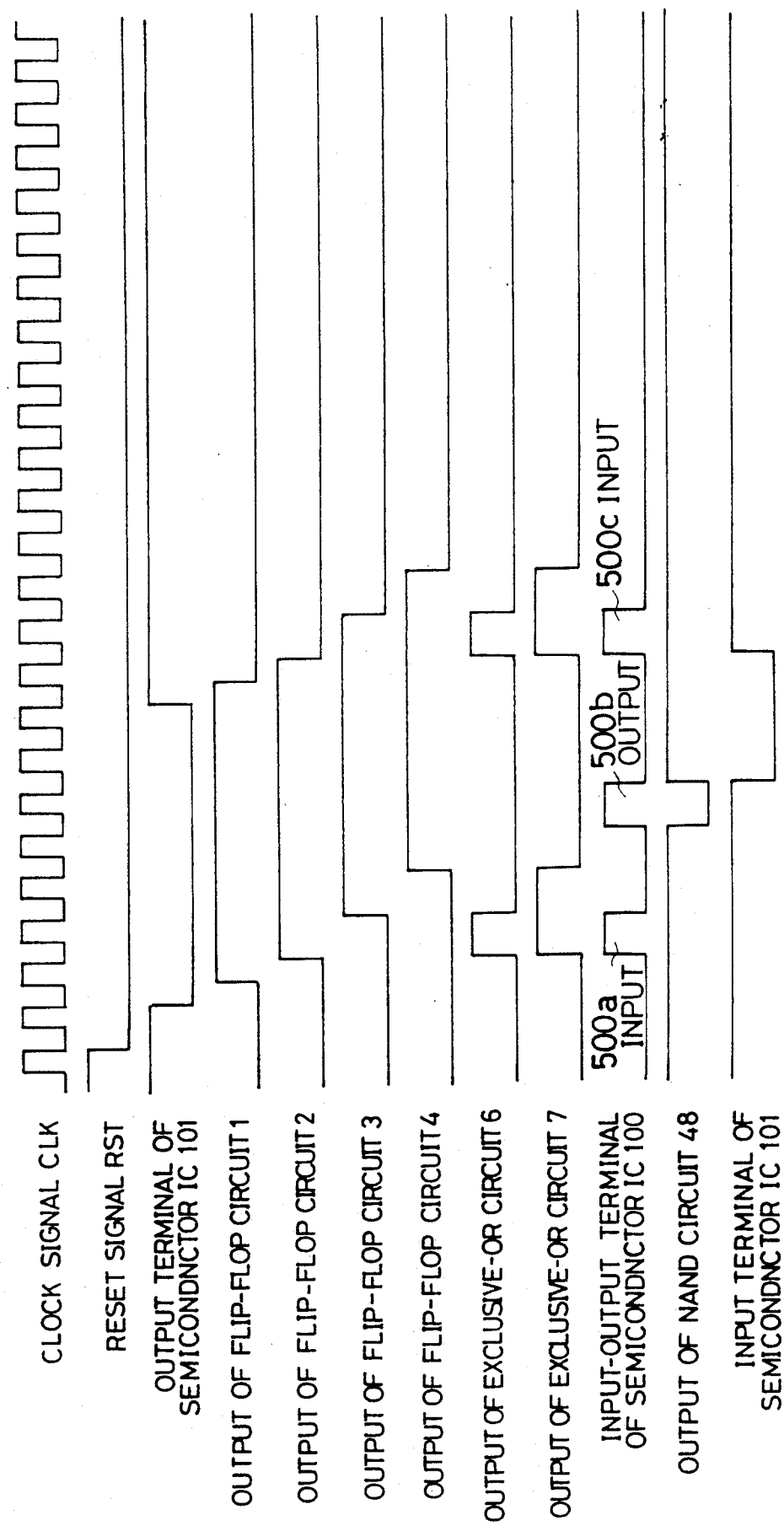
FIG. 14 is a timing chart which illustrates the operation of the bidirectional I/O signal separation circuit shown in FIG. 13.
Figure 15:
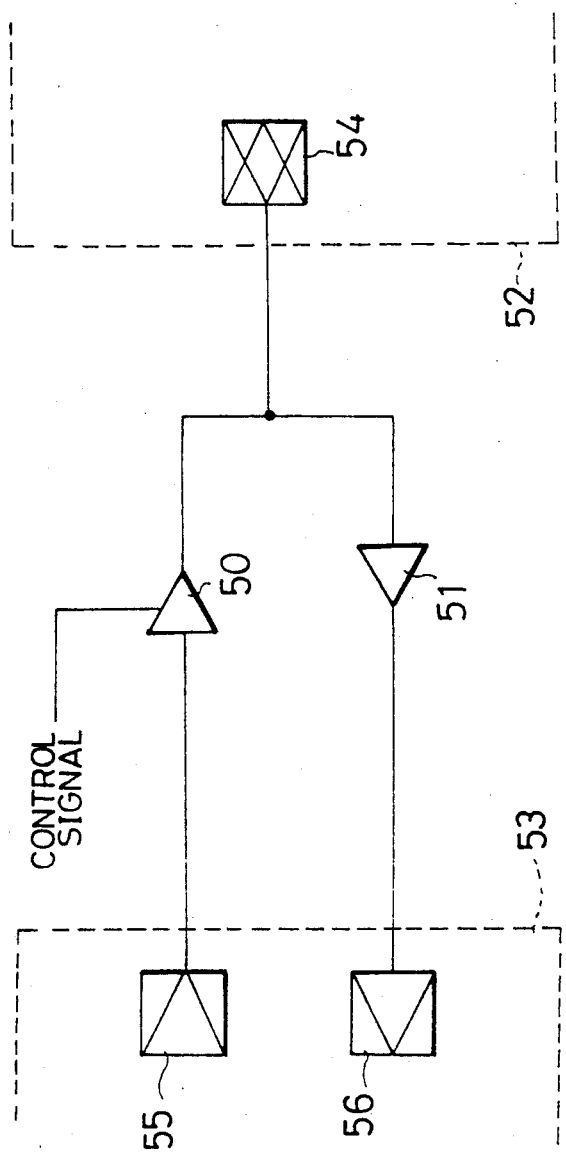
FIG. 15 is a circuit diagram which illustrates a conventional circuit for establishing a connection between a first semiconductor IC device having an individual input terminal and an output terminal and a second semiconductor IC device having a bidirectional I/O terminal.

Then, the operation of the bidirectional I/O signal separation circuit according to this embodiment will now be described. As shown in FIG. 14, when the device 101 transmits a low level signal denoting the active demand, the low level signal is reversed by the reverse circuit 49 so as to be supplied to the input D of the flip-flop circuit 1. The flip-flop circuit 1 latches the reversed signal at the first transition of the clock signal CLK. In consequence, the level of the output Q from the flip-flop circuit 1 is raised. The flip-flop circuit 2 latches the output signal from the flip-flop circuit 1 at the last transition of the next clock signal CLK, the output signal from the flip-flop circuit 2 being then latched by the flip-flop circuit 3 at the last transition of the next clock signal CLK. The output signal from the flip-flop circuit 3 is latched by the flip-flop circuit 4 at the last transition of the next clock signal CLK. As a result, the level of the output from the flip-flop circuit 3 is raised while being delayed in comparison to the flip-flop circuit 2 by one clock. Furthermore, the level of the output from the flip-flop circuit 4 is raised while being further delayed by one clock.

The EXCLUSIVE-OR circuit 6 transmits high level signals as control signals until the level of the output from the flip-flop circuit 2 is raised and as well as the level of the output from the flip-flop circuit 3 is raised. Consequently, the buffer circuit 8 is enabled to transmit a signal during the above-described time. On the other hand, the EXCLUSIVE-OR circuit 7 transmits high level signals as output signals until the level of the output from the flip-flop circuit 2 is raised and as well as the level of the output from the flip-flop circuit 4 is raised. The output signal from the EXCLUSIVE-OR circuit 7 passes through the buffer circuit 45 so as to be, as a pulse signal 500a denoting the active demand, supplied to the I/O terminal 102 during the time in which the above-described EXCLUSIVE-OR circuit 6 transmits the high level signals. Since the output signal from the EXCLUSIVE-OR circuit 7 is also supplied to the NAND circuit 48 via the reverse circuit 46, the level of the output from the NAND circuit 48 is forcibly maintained at the high level during the time in which the EXCLUSIVE-OR circuit 7 transmits the high level signals. Therefore, the output signal from the buffer circuit 45, that is, the pulse signal 500a, is not supplied to the flip-flop circuit 5. Consequently, the supply of the signal transmitted from the output terminal 103 to the input terminal 104 is prevented.

When the device 100 subsequently transmits, from its I/O terminal 102, a high level pulse signal 500b denoting a fact that it receives the active demand as the response to the pulse signal 500a, the level of the output from the NAND circuit 48 is temporarily lowered before it is raised again. As a result, the flip-flop circuit 5 is triggered. Consequently, the level of the reversed output from the flip-flop circuit 5 is lowered. In consequence, a low level signal denoting a fact that the device 100 has received the active demand is supplied to the input terminal 104.

When the device 101 then transmits high level signals each of which denotes a fact that the active demand has been cancelled, the high level signals are successively received by the flip-flop circuits 1 to 4. Furthermore, the levels of the outputs from the flip-flop circuits 1 to 4 are successively changed to low levels. The EXCLUSIVE-OR circuit 6 transmits high level signals as control signals until the level of the output from the flip-flop circuit 2 is lowered and the level of the output from the flip-flop circuit 3 is also lowered. As a result, the buffer circuit 8 is enabled to transmit a signal during the above-described time. On the other hand, the EXCLUSIVE-OR circuit 7 transmits high level signals as output signals until the level of the output from the flip-flop circuit 2 is lowered and as well as the level of the output from the flip-flop circuit 4 is lowered. The output signal from the EXCLUSIVE-OR circuit 7 is reversed by the buffer circuit 8 so as to be, as a pulse signal 500c denoting the cancellation of the active demand, supplied to the I/O terminal 102 during the time in which the above-described EXCLUSIVE-OR circuit 6 transmits the high level signals.

At this time, the high level output signal from the EXCLUSIVE-OR circuit 6 is reversed so as to be supplied to the reset terminal of the flip-flop circuit 5 via the NOR circuit 11. As a result, the flip-flop circuit 5 is reset, and the level of its reverse output is raised. In consequence, a high level signal denoting the receipt of the cancellation of the active demand is automatically supplied to the input terminal 104 of the device 101.

Many widely different embodiments of the present invention may be constructed without departing from the spirit and scope of the present invention. It should be understood that the present invention is not limited to the specific embodiments described in this specification, except as defined in the appended claims.

What is claimed is:

1. A bidirectional I/O signal separation circuit for connecting a first circuit device having a bidirectional I/O terminal with a second circuit device having individual input and output terminals, said bidirectional I/O signal separation circuit comprising:

an output control circuit connected to said output terminal for generating an output control pulse signal when a logical level of a signal transmitted from said output terminal is changed;

an input control circuit connected to said output terminal for generating an input control pulse signal when said logical level of said signal transmitted from said output terminal is changed;
an output signal generating circuit connected to said output terminal for generating an output pulse signal when said logical level of said signal transmitted from said output terminal is changed;
a buffer circuit having an input connected to said output signal generating circuit and an output connected to said I/O terminal and adapted to permit said output pulse signal to be supplied to said I/O terminal during a period of time during which said output control pulse signal is supplied to a control terminal thereof and brings said output thereof into a high impedance state during a period of time during which said output control pulse signal is not supplied to said control terminal;
a gate circuit having an input connected to said I/O terminal and adapted to block a pulse signal transmitted from said I/O terminal during a period of time during which said input control pulse signal is supplied to a control terminal thereof; and
an input signal generating circuit having an input connected to an output of said gate circuit and an output connected to said input terminal and adapted to generate a signal whose logical level is changed whenever said input signal generating circuit receives, via said gate circuit, said pulse signal transmitted from said I/O terminal and supply said generated signal to said input terminal.

2. A bidirectional I/O signal separation circuit according to claim 1, wherein each of said first and second circuit devices is a semiconductor IC formed on a single semiconductor substrate.

3. A bidirectional I/O signal separation circuit for connecting a first circuit device having a bidirectional I/O terminal with a second circuit device having individual input and output terminals, said bidirectional I/O signal separation circuit comprising:
an output control circuit connected to said output terminal for generating an output control pulse signal when a logical level of a signal transmitted from said output terminal is changed;
an input control circuit connected to said output terminal for generating an input control pulse signal when said logical level of said signal transmitted from said output terminal is changed;
an output signal generating circuit connected to said output terminal for generating an output pulse signal when said logical level of said signal transmitted from said output terminal is changed;
a buffer circuit having an input connected to said output signal generating circuit and an output connected to said I/O terminal and adapted to permit said output pulse signal to be supplied to said I/O terminal during a period of time during which said output control pulse signal is supplied to a control terminal thereof and brings said output thereof into a high impedance state during a period of time during which said output control pulse signal is not supplied to said control terminal;
a gate circuit having an input connected to said I/O terminal and adapted to block a pulse signal transmitted from said I/O terminal during a period of time during which said input control pulse signal is supplied to a control terminal thereof; and
an input signal generating circuit having an input connected to an output of said gate circuit and an output connected to said input terminal and adapted to generate a signal of first logical level on receiving, via said gate circuit, said pulse signal transmitted from said I/O terminal at said input thereof and supply said generated signal of said first logical level to said input terminal, and to generate a signal of second logical level on receiving said output control pulse signal at a control terminal thereof and supply said generated signal of said second logical level to said input terminal.

4. A bidirectional I/O signal separation circuit according to claim 3, wherein each of said first and second circuit devices is a semiconductor IC formed on a single semiconductor substrate.

* * * * *